Figure 1:
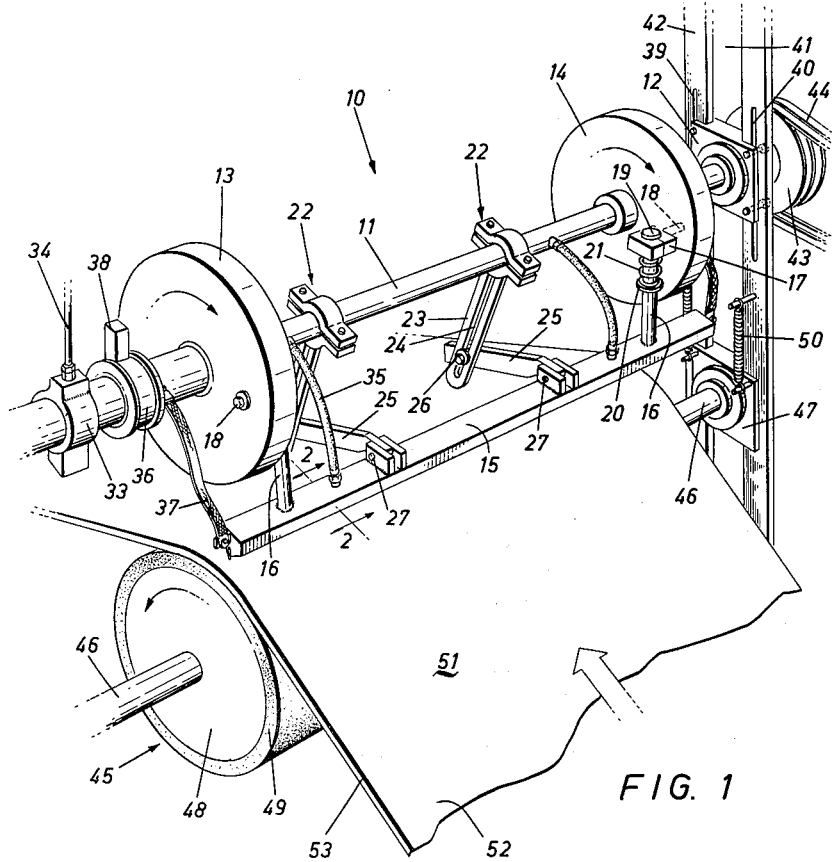

William Nelson Histed
Inventor

April 3, 1962   W. N. HISTED   3,028,294
HEAT SEALING AND CUTTING APPARATUS
Filed Feb. 13, 1961   3 Sheets-Sheet 2
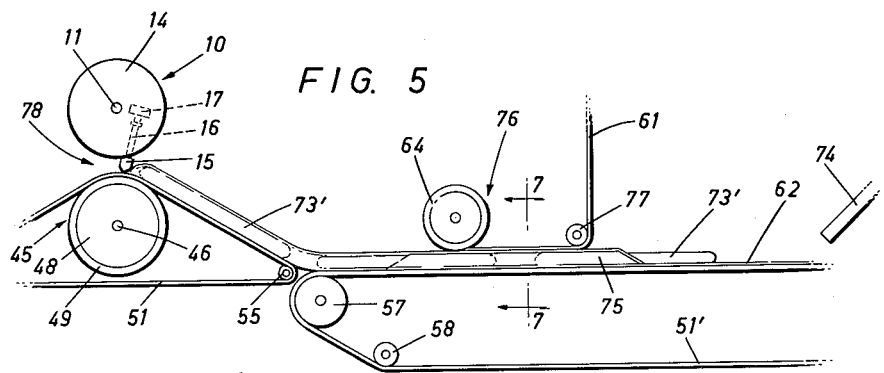
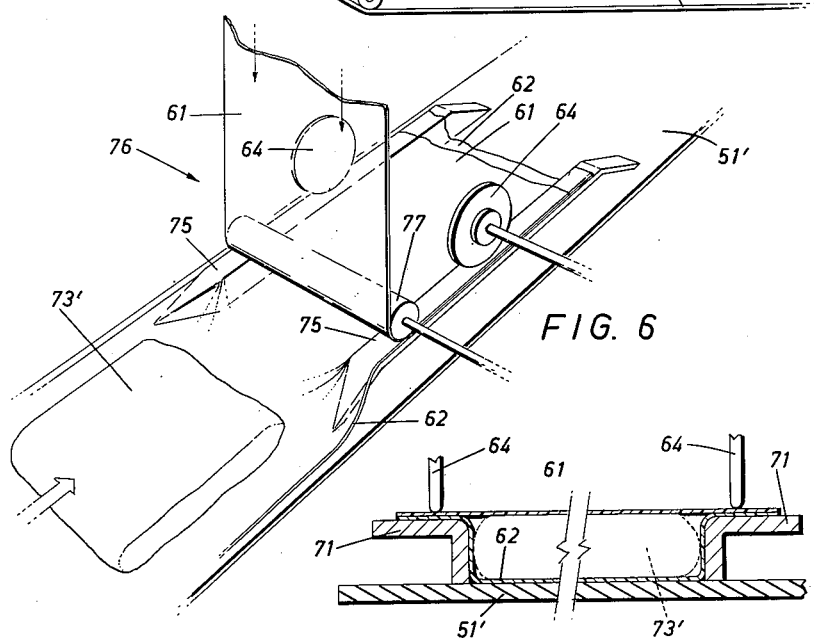
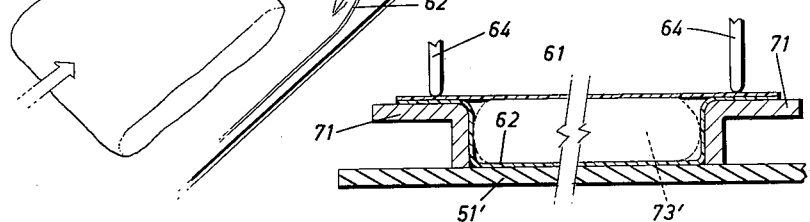
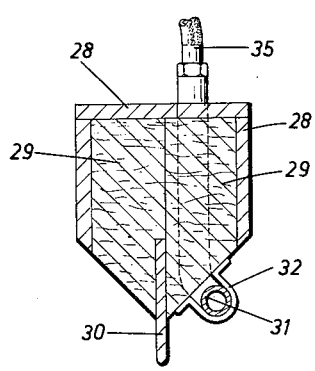
William Nelson Histed
Inventor
by: Harold G. Fox
Attorney

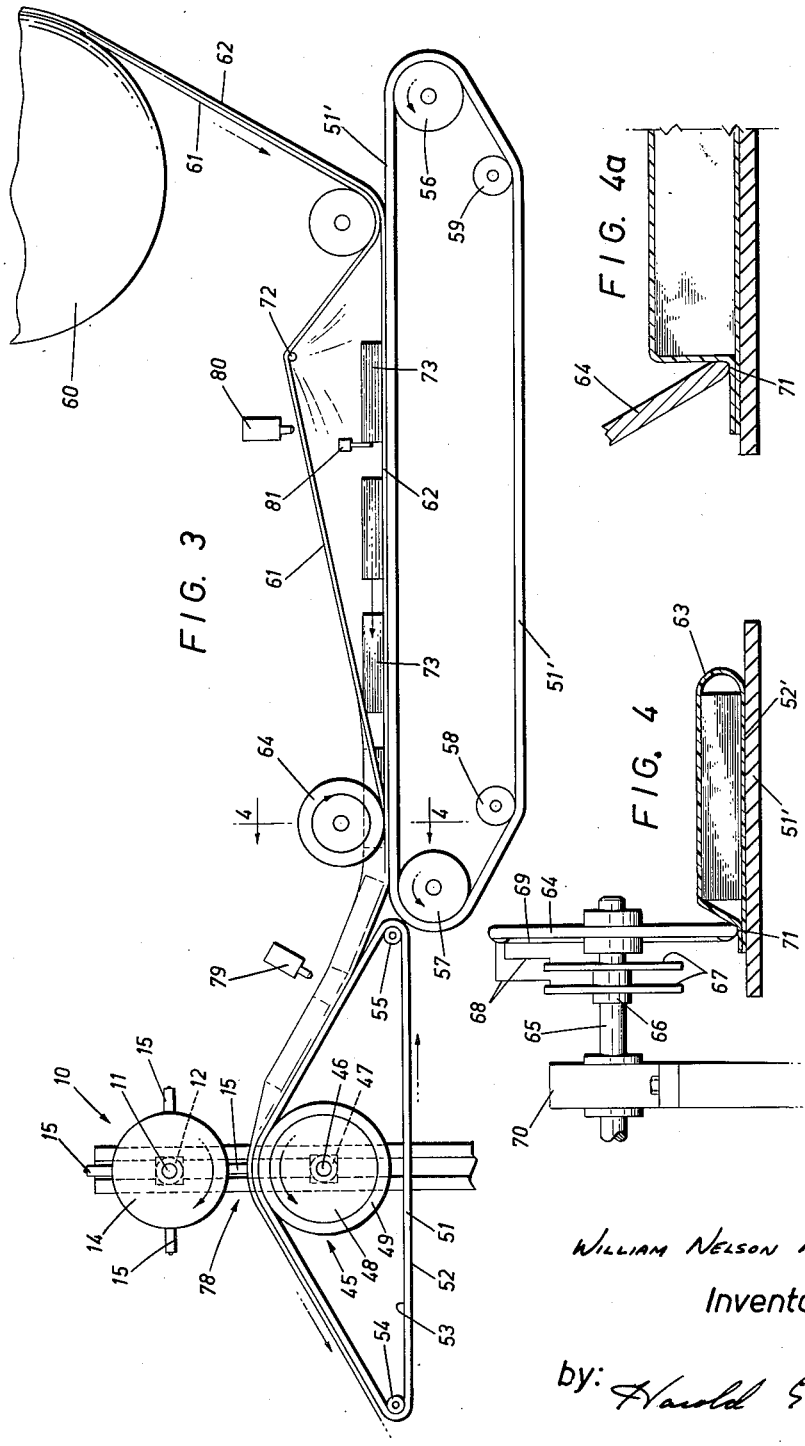

United States Patent Office 3,028,294
Patented Apr. 3, 1962

3,028,294
HEAT SEALING AND CUTTING APPARATUS
William N. Histed, 89 Empress Ave., Hamilton,
Ontario, Canada
Filed Feb. 13, 1961, Ser. No. 88,854
13 Claims. (Cl. 156—515)

This invention relates to apparatus useful for heat sealing films of the heat sealable type, such as, for example, polyethylene and polypropylene. This invention also relates to apparatus useful for heat sealing and heat cutting films such as polyethylene and polyproplyene. In additon, this invention relates to apparatus useful for individually packaging articles in containers made of heat sealable films.

It is known that a pair of films made of a material such as polyethylene or polypropylene may be sealed together effectively by the application of suitable amounts of heat and pressure. Heat sealable films of this type have desirable properties such as relatively high strength (as compared with paper of the same thickness), transparency and impermeability to water, to name only a few. Consequently such heat sealable films have been employed for the manufacture of bags and similar containers.

The most modern equipment of which I am aware for the manufacture of bags or containers of heat sealable films comprises a conveyor system for conveying a pair of heat sealable films positioned one on top of another to a heat sealing and cutting station. A reciprocating, pivotally mounted sealing and cutting beam is provided at the station and is heated to a suitable temperature. The conveyor system conveys a predetermined amount of the films, which usually have been previously sealed or otherwise joined together at one side, beyond the sealing and cutting station. This predetermined amount is sufficient to make 1 bag. When this predetermined amount of the films is in position, the conveyor system and hence the films stop. In this stopped position, the sealing and cutting beam descends upon and across the upper film, and pressure is applied to the films between the conveyor system and the beam. The result of this pressure and the heat of the beam is to seal the upper and lower films together. If sujcient heat and pressure are employed, the result is to cut the films as well as to seal the films on either side of the cut. The pivoting beam then pivots upwardly and assumes its original position. As soon as the beam is withdrawn from contact with the film, the conveyor system moves forward again placing another predetermined amount of the films beyond the cutting and sealing station, and the operation is repeated. The completed bags are withdrawn from the apparatus by a conveyor.

A serious disadvantage of such apparatus as just described is the time consumed in making each bag. A large proportion of the time consumed is that which occurs as a result of the stoppage of the conveyor, the apparatus operating in regular intervals rather than continuously. To date it has been thought, however, that such intermittent operation was necessary to achieve adequate "dwell time," i.e. adequate time for the beam to seal or seal and cut the films and obtain proper film tension for seams.

It is accordingly a primary object of my invention to provide continuously operating apparatus for sealing or sealing and cutting heat sealable films.

Heat sealable films such as polyethylene or polypropylene are such that printing may be easily impressed thereupon. Accordingly, bags or containers made of such films commonly carry printed advertising matter, or other printed matter such as instructions for the use of an article which may be packaged therein. In the past it has been common practice to print such matter on a continuous roll of the film, the printed matter being duplicated on each section of the continuous film from which a bag is to be made. The printed roll then has been conveyed to a bag-making machine, such as the one previously mentioned, and processed as aforementioned. Because there is a great disparity in the speed of operation of a printing press, which is relatively fast, and the relatively slower speed of operation of such a bag-making machine, it has not been possible to lead the film directly from the printing press to the bag-making machine.

Accordingly it is another important object of my invention to provide bag or container-making apparatus capable of operating at speeds in line with the speeds of printing presses.

A further important object of my invention is to provide improved apparatus for heat sealing films of the heat sealable type.

Yet another important object of my invention is to provide improved heat sealing and cutting apparatus capable of heat sealing and cutting films of the heat sealable and heat cuttable type.

A further object of my invention is to provide apparatus capable of continuously manufacturing and loading bags of heat sealable films, each bag containing an article such as, for example, a newspaper or telephone directory, or loose materials such as flour, corn starch, cement, etc.

An important feature of my invention rests in the discovery that, contrary to previous belief, a pair of heat sealable films may be sealed together or sealed together and cut by a heated beam or blade continuously rotating about an axis, the beam bearing on the films to exert pressure thereon during a 'portion of a rotation of the beam.

In brief, one embodiment of heat sealing apparatus constructed in accordance with my invention consists of supporting means adapted to support an upper heat sealable film and a lower heat sealable film at a sealing position, the upper film lying on top of the lower film, and heat sealing means above the supporting means at the sealing position. The heat sealing means consists of a sealing member rotatably mounted about an axis, means for completely rotating the sealing member about its axis, and means for heating the sealing member to a heat sealing temperature. The heat sealing member is positioned such that during a portion of a rotation it is adapted to lie across and firmly contact the upper heat sealable film. The temperature of the heat sealing member and the pressure between it and the supporting means is sufficient to heat seal the upper and lower films together.

Other objects and advantages of apparatus embodying my invention will become apparent from the following detailed description taken in conjunction with the drawings, in which:

FIGURE 1 shows part of rotary heat sealing and cutting apparatus embodying my invention, FIGURE 2 is a section taken along line 2—2 in FIGURE 1, FIGURE 3 is a schematic representation of heat sealing and cutting apparatus embodying my invention, FIGURES 4 and 4a are sections taken along line 4—4 in FIGURE 3 for two positions of the side sealing wheel, FIGURE 5 is a schematic representation of another embodiment of my invention, FIGURE 6 is a perspective view of part of the apparatus shown in FIGURE 5, and FIGURE 7 is a section taken along line 7—7 in FIGURE 5.

Referring now to the drawings, in particular to FIGURES 1 and 2, for a more detailed description of my invention, I have shown rotary heat sealing or heat sealing and cutting apparatus generally designated by the numeral 10. Apparatus 10 comprises a shaft 11 which is rotatably mounted in bearings 12 (only one shown) adjacent both ends thereof. Flanges 13 and 14 are secured to shaft 11 adjacent the ends thereof. A heat sealing or heat sealing and cutting member 15 is secured to rods 16, which extend into and are axially slidable in cylinders 17. These cylinders are pivotally mounted at 18 on flanges 13 and 14. Rods 16 are provided with collars 19 and 20. Collars 19 serve as stops to limit outward movement of rods 16 away from shaft 11 under the influence of springs 21 which are provided between collars 20 and a surface of cylinders 17. It will be seen from the foregoing description that member 15 is resiliently supported on flanges 13 and 14 and is permitted to move inwardly generally towards shaft 11 when sufficient inwardly directed force is exerted on member 15 to compress springs 21.

Flanges 13 and 14, shaft 11, cylinders 17 and rods 16 are preferably manufactured of iron or steel.

In addition to being supported from flanges 13 and 14 by rods 16 and cylinders 17, member 15 is connected to shaft 11 by a pair of link mechanisms 22. Each link mechanism 22 comprises a crank arm 23 securely fixed to shaft 11 and having a guideway 24 therein. A link member 25 is pivotally connected at pivot point 26 to crank arm 23 and is pivotally connected to member 15 at pivot point 27. Pivot point 26 is not free to slide in guideway 24 during operation of the apparatus, but the position of point 26 in guideway 24 may be adjusted. It will be seen from the foregoing that member 15 is adapted to rock or pivot back and forth about pivot point 27, this movement being accompanied by rocking or pivoting of cylinders 17 about pivot points 18.

It should be noted that more than one member 15 with accompanying link mechanisms 22, rods 16, cylinders 17, etc., may be provided. If two are provided, they should be spaced 180° apart; three would be spaced 120° apart; four would be spaced 90° apart, and so on.

The construction of member 15 is best shown in FIGURE 2. Each member 15 consists of a U-shaped trough 28, preferably of iron or steel. Positioned in trough 28 and secured thereto by any suitable means is an electrical insulator 29 such as glastick. Secured to insulator 29 by any suitable means is a blade 30 which projects beyond insulator 29, and which may be of a material such as the nickel-iron alloy known as Nichrome.

Positioned behind blade 30 is a tube 31 secured to insulator 29 by clips 32. Tube 31 may conveniently be made of copper. As best shown in FIGURE 1, each end of shaft 11 is hollow, and rotary valves 33 of well known design are connected at the ends of shaft 11. Valves 33 connect through pipes 34 to a source of coolant, e.g., water. The chambers in the ends of shaft 11 are connected through pipes 35 to the ends of tube 31. Thus, as the rotary apparatus shown in FIGURE 1 is rotated in the direction of the arrows shown on flanges 13 and 14, cooling water may be passed through one pipe 34 from the coolant supply, through one valve 33, the chamber in one end of shaft 11, one pipe 35, tube 31, the other pipe 35, the other chamber in shaft 11, the other valve 33 and the other pipe 34. The coolant may be returned to the coolant supply, cooled and recirculated, or may be discharged to waste.

As best seen in FIGURE 1, slip rings 36 are mounted on shaft 11 adjacent each end thereof and are insulated therefrom. Slip rings 36 are connected to the ends of blade 30 by conductors 37. A heating current may be supplied to blade 30 through brushes 38 which contact slip rings 36, and which are connected to any suitable source (not shown) of electrical power. This power source should be such that the power output thereof can be varied, thereby permitting control of the temperature of blade 30, this blade serving as a resistance element.

As shown in FIGURES 1 and 3, shaft 11 is rotatably supported about its longitudinal axis in bearings 12 which are slidably mounted for up and down movement in guides 39, 40 and 41 in frame members 42, it being understood that a bearing 12 and a frame member 42 are provided at the left hand end of shaft 11 in FIGURE 1. Bearings 12 are fixed in frames 42 by nuts and bolts which can be loosened to permit adjustment of the bearings, and hence shaft 11, upwardly or downwardly. Shaft 11 is adapted to be rotated by any suitable means such as a variable speed electric motor (not shown) through a pulley 43 connected to shaft 11, and V-belts 44. If desired, shaft 11 may be driven through gears connected between the shaft and motor.

As best shown in FIGURES 1, 3 and 5, positioned below apparatus 10 is a back-up roller 45 which is rotatably mounted by means of a shaft 46 journalled in bearings 47. Preferably roller 45 has an inner core 48 of hard rubber surrounding shaft 46, and an outer covering 49 of one-half inch sponge rubber. The surface of the roller is, therefore, resilient and deformable. Bearings 47 are mounted for slidable movement in guides 41 in frames 42 and are resiliently suspended from frames 42 by springs 50. While roller 45 is rotatable about its longitudinal axis, and rotates in the direction shown by the arrow thereon in FIGURE 1 during operation of the apparatus, roller 45 is not rotated by a motor or the like.

A conveyor belt 51 having an upper surface 52 and a lower surface 53 extends over a pair of rollers 54 and 55, both of which are rotatably mounted in bearings (not shown). Roller 54 is connected to a variable speed electric motor (not shown) which drives the roller and conveyor belt 51. Conveyor belt 51 is resilient and deformable under a force applied to its upper surface and preferably is constructed of Teflon. A conveyor belt 51' travelling over rollers 56, 57, 58 and 59, all of which are rotatably mounted in bearings (not shown), is provided. Roller 57 is driven in the direction shown by the arrow thereon by a suitable motor (not shown). Conveyor belt 51' serves as a feed conveyor for belt 51.

Rotatably supported above conveyor belt 51' is a reel 60 of a heat sealable film. The heat sealable film which may, for example, be polyethylene, comprises an upper film 61 and a lower film 62 underlying the upper film. Films 61 and 62 are joined and folded at rear edge 63 (FIGURE 4). Lower film 62 rides on upper surface 52' of conveyor belt 51'.

Rotatably mounted near one end of belt 51 and at one side thereof is a rotatable, heat sealing wheel 64. This wheel is best shown in FIGURE 4. Wheel 64, which may be made of steel, is secured to a shaft 65 by any suitable means. Slip ring insulation 66 is firmly secured to shaft 65, and a pair of slip rings 67 are fastened to insulation 66. Slip rings 67 are connected by leads 68 to opposite ends of an electric resistance heating element 69 secured to wheel 64 in good heat conductive relationship therewith. Slip rings 67 are connected to a source of variable electric energy (not shown) by conventional brushes and leads (not shown). The temperature of wheel 64 may be varied by varying the amount of electrical energy supplied to element 69. Shaft 65 is freely rotatable in a pivot type bearing 70 which permits the pressure applied to the films by the wheel to be varied. The peripheral edge of wheel 64 is adapted to engage edge 71 of upper film 61, and the heat of wheel 64 and the pressure between the wheel and conveyor belt 51' is adapted to seal films 61 and 62 together. By virtue of pivot type bearing 70, wheel 64 may be tilted as shown in FIGURE 4a to keep the hot wheel away from the side of film 61, when this film covers a large article.

It will be appreciated that if films 61 and 62 are not joined at edge 63, as is presently contemplated, a similar wheel 64 may be provided on the opposite side of the apparatus (see FIGURE 6) to seal films 61 and 62 together at edge 63. Moreover, if films 61 and 62 are joined at both edges so that they form a flat tube, it will be appreciated that no wheel 64 will be required.

In front of reel 60 is an arm 72 over which upper film 61 rides. Arm 72 separates films 61 and 62 and provides a loading station. Articles to be packaged, such as telephone books 73 are inserted between films 61 and 62 at the loading station by any suitable dispensing and loading apparatus.

The embodiment of my invention schematically illustrated in FIGURES 5, 6 and 7 is similar to that shown in FIGURE 3, and identical parts are numbered identically in these figures. In this embodiment of the invention, a newspaper 73' or similar article is dropped from any suitable dispenser, such as chute 74, onto a lower heat sealable film 62 travelling on conveyor belt 51'. Film 62 may be unwound from a reel (not shown).

As best shown in FIGURES 6 and 7, the edges of belt 51' are forced to ride up on formers 75 at station 76. An upper heat sealable film 61 is unwound from a reel (not shown), travels under a roller 77 and is laid on top of papers 73' at station 76. The edges of the heat sealable films are sealed by wheels 64 mounted adjacent both sides of belt 51'. After this operation, the newspapers 73' positioned in a tube of heat sealable film are passed on to the cutting and sealing station at 78. The operation performed at cutting and sealing station 78 (FIGURE 5) will become apparent from the following description of the apparatus of FIGURE 3 which has an identical cutting and sealing station 78 comprising the equipment shown in FIGURE 1 modified by the addition of three blade members 15 and associated equipment.

In the operation of the embodiment of my invention shown in FIGURE 3, films 61 and 62 are led through the apparatus until they extend beyond the sealing or sealing and cutting station 78. Upper film 61 is led over arm 72 at the loading station. The temperature of wheel 64 is adjusted by control of the power source connected thereto, and the pressure between the edge of wheel 64 and belt 51' adjusted by movement of bearing 70 to the point where wheel 64 will effectively seal edges 71 of films 61 and 62 (FIGURE 4). The temperature of blades 30 is adjusted by control of the power source connected thereto, and the pressure between blades 30 and belt 51 is adjusted by movement of bearings 12, so that when blades 30 sandwich the films between the blades and upper surface 53 of belt 51, sufficient pressure and heat will be applied to films 61 and 62 to cut through the same and seal the edges on opposite sides of the blade.

When the foregoing adjustments have been made, belts 51 and 51' are started by running the motors driving rollers 54 and 57, and as the conveyor belts move forward, they carry with them films 61 and 62. Heat sealing and cutting device 10 is rotated by running the motor driving shaft 11. This device is rotated in a direction such that the four blades 30 at cutting and sealing station 78 are travelling in the same direction as films 61 and 62 when they contact the upper film.

Articles such as telephone books 73 are loaded between films 61 and 62 at the loading station. The speed of conveyor belts 51 and 51', the interval between the loading of articles 73 and the speed and hence position of blades 30 are synchronized so that blade 30 will be at the cutting and sealing station between every adjacent article. It will thus be appreciated that where two or more members 15 are employed, these members being spaced 180° apart, one blade will cut and seal the rear edge of the front bag and the front edge of the intermediate bag, and the next blade will cut and seal the rear edge of the intermediate bag and the front edge of the rear bag. As many blades as are necessary may be provided. If only one member 15, and hence one blade 30 is used, this blade must perform all the cutting and sealing operations on all the bags, and for the same conveyor speed and article spacing must be rotated twice as fast as when two members 15 spaced 180° apart are employed, and four times as fast as when four members 15 spaced 90° apart are employed.

In order to produce bags having exceptionally good front and back seals, I have found it desirable to employ a blade member 15 which is pivotable about points 27. This feature, coupled with the fact that cylinders 17 are pivotable at 18, permits blade member 30 to remain approximately perpendicular to the surface of back-up roller 45 during the time that the blade contacts the films and compresses them against belt 51 and roller 45. The rolling or rocking action of member 15 lessens the tendency for the blade to pull away from the films immediately behind the blade. This tendency which is present without the rocking action does not appreciably affect the strength of the front seal, but does materially affect the strengh of the rear seal. It will be appreciated that many means other than mechanisms 22 may be employed to obtain this rocking action.

In addition, in order to produce bags, especially of polyethylene, having exceptionally strong seals, it is necessary to provide a heat sink on member 15. This heat sink may be, for example, tube 31 (FIGURE 2) carrying cold water. This tube is positioned behind blade 30, i.e., adjacent the right hand side of the blade when looking at member 15 from the left-hand end in FIGURE 1. Tube 30 contacts upper film 61 while the films are being sealed and cut. It may be necessary in certain cases to place a similar heat sink in front of blade 30.

The provision of springs 21, springs 50, and the fact that the surface of roller 45 is resilient insures adequate "dwell time," i.e., time during which the blade firmly engages films 61 and 62.

Preferably the loading and discharge ends of conveyor 51 are sloped in the manner shown in FIGURES 3 and 5. This permits closer spacing of articles 73 without interference with blade 30 during its rotation than would be possible if conveyor belt 51 were horizontal.

The completely packaged articles 73 may be withdrawn from the discharge end of conveyor 51 by another conveyor.

It will be seen that the apparatus just described will continuously produce completely sealed bags containing articles of one sort or another.

If desired, wheel 64 could be eliminated and film 61 could be of less width than film 62. In this manner bags having an open end with a flap to cover the end could be formed.

If it is desired to form tubular bags open at one end, films 61 and 62 being joined at their edges, wheel 64 may be eliminated and the apparatus adjusted so that blade 30 seals films 61 and 62 together at positions spaced apart by a predetermined amount. The product of the apparatus then is a flat tubular strip sealed together at spaced apart points. In order to cut the strip into bags, a cold cutting roll may be employed. Such a roll per se is known in the art and operates in such a manner as to continuously cold cut the strip just ahead of or behind the seal, thereby forming a plurality of bags.

An embodiment of my invention which has been successfully constructed and operated had two blades 30 spaced apart 180° and travelling in a circle of 27" circumference. The apparatus operated at a rate of 18,000 bags per hour per line to produce bags 8 inches wide. The blade 30 contacted upper film 61 during about 1½" of blade travel.

Referring again to FIGURE 3, when articles 73 are to be packaged in plain, unprinted film, indexing of the apparatus may be achieved by the provision of a scanner 79 of a known type. Scanner 79 scans a portion of belt 51 at a known and fixed distance from the cutting and sealing station 78. The scanner detects the gap between articles 73 and produces an electrical output signal which is fed to control circuitry of a known type, and which varies the speed of the motor driving shaft 11 so as to insure that blade 30 arrives at the cutting and sealing station between the articles 73. This synchronization may also be achieved by known mechanical methods.

When articles 73 are to be packaged in printed films, scanner 79, a scanner 80 and a release brake 81, all known in the art, may be employed. Scanner 80, through known control circuitry, releases brake 81 when article 73 is correctly positioned with respect to the printing on upper film 61.

It will be appreciated that while I have described films 61 and 62 as being unwound from a reel or reels, apparatus embodying my invention operates sufficiently quickly that the films may be fed directly into the apparatus from a printing press.

Apparatus embodying my invention may be employed to manufacture empty containers having one open end, or containers having articles or materials therein and being completely sealed or having one open end, with or without a flap.

While I have described certain embodiments of my invention, it will be appreciated that numerous modifications and alterations may be made thereto without departing from the spirit and scope of my invention as defined in the appended claims.

What I claim as my invention is:

1. Heat sealing apparatus comprising conveying means adapted to continuously convey an upper heat sealable film on top of a lower heat sealable film to a sealing position, said films being supported from behind said lower film at said sealing position, and heat sealing means positioned in front of said films at said sealing position, said heat sealing means comprising at least one heat sealing blade rotatably mounted to rotate about a first axis, said heat sealing blade being mounted for limited pivotal movement about a second axis parallel to said first axis, means for completely rotating said blade about said first axis in a direction such that at said sealing position said blade and said film travel in at least substantially the same direction, and means for heating said blade to a heat sealing temperature, said blade being adapted to lie across and firmly contact said upper film at said sealing position, the temperature of said blade and the pressure of said blade on said films at said sealing position being sufficient to heat seal said upper and lower films.

2. Heat sealing apparatus comprising a conveyor belt adapted to continuously convey an upper heat sealable film on top of a lower heat sealable film to a sealing and cutting position, back-up means positioned behind said conveyor belt at said sealing and cutting position, the undersurface of said conveyor belt contacting said backup means at least during sealing and cutting of said films, said films being resiliently supported from behind said lower film at said sealing and cutting position, and heat sealing and cutting means positioned in front of said films at said sealing and cutting position, said heat sealing and cutting means comprising at least one heat sealing and cutting blade rotatably mounted to rotate about a first axis, said heat sealing blade being mounted for limited pivotal movement about a second axis parallel to said first axis, means for completely rotating said blade about said first axis in a direction such that at said sealing and cutting position said blade and said films travel in at least substantially the same direction, and means for heating said blade to a heat sealing and cutting temperature, said blade being adapted to lie across and firmly contact said upper film at said sealing and cutting position, the temperature of said blade and the pressure of said blade on said films at said sealing and cutting position being sufficient to heat seal and cut said upper and lower films.

3. Heat sealing apparatus comprising means adapted to continuously convey an upper heat sealable film on top of a lower heat sealable film to a sealing position, said films being supported from behind said lower film at said sealing position, and heat sealing means positioned in front of said films at said sealing position, said heat sealing means comprising a pair of heat sealing blades rotatably mounted to rotate about and spaced equidistant from a first axis, said blades being positioned at least substantially 180° apart, said heat sealing blades being mounted for limited pivotal movement about second and third axes respectively, said second and third axes being parallel to said first axis, means for completely rotating said blades about said axis in a direction such that a blade at said sealing position travels in at least substantially the same direction as said films, and means for heating said blades to a heat sealing temperature, each of said blades being adapted to successively lie across and firmly contact said upper film at said sealing position, the temperature of said blades and the pressure of said blades on said films at said sealing position being sufficient to heat seal said upper and lower films.

4. Heat sealing apparatus comprising means adapted to continuously convey an upper heat sealable film on top of a lower heat sealable film to a sealing position, said films being supported from behind said lower film at said sealing position, and heat sealing means positioned in front of said films at said sealing position, said heat sealing means comprising a member rotatably mounted to rotate about a first axis in a pair of bearings, at least one heat sealing blade secured to said member, said heat sealing blade being mounted for limited pivotal movement about a second axis parallel to said first axis, means for completely rotating said member and said blade about said longitudinal axis in a direction such that at said sealing position said blade and said films travel in at least substantially the same direction, means for electrically heating said blade to a heat sealing temperature, and means for raising and lowering said bearings, said blade being adapted to lie across and firmly contact said upper film at said sealing position, the temperature of said blade and the pressure of said blade on said films at said sealing position being sufficient to heat seal said upper and lower films.

5. Heat sealing and cutting apparatus comprising a conveyor belt adapted to continuously convey an upper heat sealable film on top of a lower heat sealable film to a sealing and cutting position, back-up means positioned behind said conveyor belt at said sealing and cutting position, the undersurface of said conveyor belt contacting said back-up means at least during sealing and cutting of said films, said films being resiliently supported from behind said lower film at said sealing and cutting position, frame members positioned on both sides of said conveyor belt at said sealing and cutting position, a shaft rotatably mounted about its longitudinal axis in a pair of bearings, one of said bearings being supported in one frame member and the other bearing being supported in the other frame member, securing means securing at least one heat sealing and cutting blade to said shaft, said heat sealing blade being mounted for limited pivotal movement about a second axis parallel to said first axis, means for completely rotating said shaft and said blade about said longitudinal axis in a direction such that at said sealing and cutting position said blade and said films travel in at least substantially the same direction, means for electrically heating said blade to a heat sealing and cutting temperature, and means for raising and lowering said bearings, said blade being adapted to lie across and firmly contact said upper film at said sealing and cutting position, the temperature of said blade and the pressure of said blade on said films at said sealing and cutting position being sufficient to heat seal and cut said upper and lower films.

6. Heat sealing and cutting apparatus according to claim 5 wherein said back-up means comprises a roller having a resilient, deformable surface.

7. Heat sealing apparatus according to claim 6 including means resiliently supporting said back-up means.

8. Heat sealing apparatus according to claim 5 wherein said blade is resiliently mounted, said blade being adapted to be moved under pressure inwardly generally towards said first axis.

9. Heat sealing apparatus comprising means adapted to continuously supply an upper heat sealable film on top of a lower heat sealable film to a sealing position, said films being supported from behind said lower film at said sealing position, and heat sealing means positioned in front of said films at said sealing position, said heat sealing means comprising at least one heat sealing blade rotatably mounted about a first axis, means mounting said heat sealing blade for limited pivotal movement about a second axis parallel to said first axis, means for completely rotating said blade about said first axis in a direction such that at said sealing position said blade and said films travel in at least substantially the same direction, and means for heating said blade to a heat sealing temperature, said blade being adapted to lie across and firmly contact said upper film at said sealing position, the temperature of said blade and the pressure of said blade on said films at said sealing position being sufficient to heat seal said upper and lower films.

10. Heat sealing and cutting apparatus comprising means adapted to continuously convey an upper heat sealable film on top of a lower heat sealable film to a sealing and cutting position, back-up means resiliently supporting said films from behind said lower film at said sealing and cutting position, and heat sealing and cutting means positioned in front of said films at said sealing and cutting position, said heat sealing and cutting means comprising at least one blade rotatably mounted about a first axis, means mounting said blade for limited pivotal movement about a second axis parallel to said first axis, means for completely rotating said blade about said first axis in a direction such that at said sealing and cutting position said blade and said films travel in at least substantially the same direction, and means for heating said blade to a heat sealing and cutting temperature, said blade being adapted to lie across and firmly contact said upper film at said sealing and cutting position, said blade being resiliently mounted and adapted to move generally towards said first axis during contact with said upper film, the temperature of said blade and the pressure of said blade on said films being sufficient to heat seal and cut said upper and lower films.

11. Heat sealing apparatus according to claim 9 wherein said blade is resiliently mounted, said blade being adapted to be moved under pressure inwardly generally towards said first axis.

12. Heat sealing apparatus according to claim 9 including a heat sink positioned on the trailing side of said blade.

13. Heat sealing apparatus according to claim 5 including a heat sink positioned on the trailing side of said blade.

References Cited in the file of this patent
UNITED STATES PATENTS

| 2,759,308 | Nawrocki | Aug. 21, 1956 |
| 2,780,275 | Rusch | Feb. 5, 1957 |
| 2,984,288 | Gaubert | May 16, 1961 |